United States Patent
Zhao et al.

(10) Patent No.: US 11,909,536 B2
(45) Date of Patent: Feb. 20, 2024

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 64 days.

(21) Appl. No.: 17/195,400

(22) Filed: Mar. 8, 2021

(65) Prior Publication Data
US 2021/0194647 A1 Jun. 24, 2021

Related U.S. Application Data

(63) Continuation of application No. PCT/CN2018/106048, filed on Sep. 17, 2018.

(51) Int. Cl.
*H04L 1/1867* (2023.01)
*H04W 76/11* (2018.01)
(Continued)

(52) U.S. Cl.
CPC .......... *H04L 1/1896* (2013.01); *H04W 72/02* (2013.01); *H04W 76/11* (2018.02); *H04W 92/18* (2013.01)

(58) Field of Classification Search
None
See application file for complete search history.

(56) References Cited

U.S. PATENT DOCUMENTS

2010/0023934 A1* 1/2010 Sheehan ............... G06F 8/71
717/169
2011/0069681 A1* 3/2011 Kang ................. H04W 72/042
370/335
(Continued)

FOREIGN PATENT DOCUMENTS

CN 105813204 A 7/2016
CN 105940738 A 9/2016
(Continued)

OTHER PUBLICATIONS

Abedini. U.S. Appl. No. 62/656,619 Provisional Application corresponding to US20190320299 (Year: 2018).*
(Continued)

*Primary Examiner* — Andre Tacdiran
(74) *Attorney, Agent, or Firm* — PERKINS COIE LLP

(57) ABSTRACT

Provided by the implementations of the present application are a communication method and terminal, which may achieve reliability of system transmission by using a terminal-to-terminal mode to carry out communication. The method comprises: a first terminal device receiving a first sidelink transmission channel sent by a second terminal device, the first sidelink transmission channel being used to transmit a first message; in response to the first message, the first terminal device sending a second sidelink transmission channel to the second terminal device, the second sidelink transmission channel being used to transmit a second message, and the second message being a feedback message for the first message.

24 Claims, 4 Drawing Sheets

(51) Int. Cl.
  *H04W 72/02* (2009.01)
  *H04W 92/18* (2009.01)

(56) References Cited

U.S. PATENT DOCUMENTS

| | | | | |
|---|---|---|---|---|
| 2013/0184013 | A1* | 7/2013 | Chao | H04W 68/02 |
| | | | | 455/458 |
| 2015/0055503 | A1* | 2/2015 | Xia | H04L 5/0035 |
| | | | | 370/252 |
| 2016/0013902 | A1* | 1/2016 | Cui | H04L 1/1896 |
| | | | | 370/329 |
| 2016/0088651 | A1* | 3/2016 | Yu | H04L 5/0053 |
| | | | | 370/329 |
| 2018/0035427 | A1* | 2/2018 | Gupta | H04L 1/0003 |
| 2018/0060088 | A1* | 3/2018 | Baer | G06F 16/907 |
| 2018/0063816 | A1* | 3/2018 | Gulati | H04W 72/1289 |
| 2019/0052436 | A1* | 2/2019 | Desai | H04L 5/0055 |
| 2019/0082484 | A1* | 3/2019 | Nory | H04W 76/14 |
| 2019/0320299 | A1* | 10/2019 | Abedini | H04L 5/0062 |
| 2019/0363860 | A1 | 11/2019 | Kim et al. | |
| 2019/0380152 | A1* | 12/2019 | Abedini | H04W 4/40 |
| 2020/0022173 | A1* | 1/2020 | Luo | H04W 72/23 |
| 2020/0029318 | A1* | 1/2020 | Guo | H04W 72/042 |
| 2020/0052775 | A1* | 2/2020 | Nam | H04B 17/336 |
| 2020/0092692 | A1* | 3/2020 | Wang | H04W 76/14 |
| 2020/0228257 | A1* | 7/2020 | Baldemair | H04L 1/1614 |
| 2020/0305163 | A1* | 9/2020 | Liu | H04W 72/0446 |
| 2020/0374059 | A1* | 11/2020 | Wang | H04B 1/713 |
| 2021/0029687 | A1* | 1/2021 | Hong | H04L 5/0053 |
| 2021/0076261 | A1* | 3/2021 | Xin | H04W 24/02 |
| 2021/0160037 | A1* | 5/2021 | Ji | H04L 5/0048 |
| 2021/0297221 | A1* | 9/2021 | Lee | H04L 5/0055 |
| 2021/0298040 | A1* | 9/2021 | Zhao | H04W 72/1236 |
| 2021/0314919 | A1* | 10/2021 | Kwak | H04W 72/02 |

FOREIGN PATENT DOCUMENTS

| | | | |
|---|---|---|---|
| CN | 106954272 | A | 7/2017 |
| CN | 107690127 | A | 2/2018 |
| CN | 108093489 | * | 5/2018 |
| CN | 108322414 | A | 7/2018 |
| CN | 108347313 | A | 7/2018 |
| EP | 3099091 | * | 11/2016 |
| EP | 3136631 | A1 | 3/2017 |
| EP | 3242515 | A1 | 11/2017 |
| EP | 3335495 | A1 | 6/2018 |
| JP | 2018129803 | A | 8/2018 |
| JP | 2021500758 | * | 1/2021 |
| WO | WO2011082542 | * | 7/2011 |
| WO | 2016076301 | A1 | 5/2016 |
| WO | 2016107244 | A1 | 7/2016 |
| WO | 2016159712 | A1 | 10/2016 |
| WO | 2018137452 | A1 | 8/2018 |
| WO | 2018151637 | A1 | 8/2018 |

OTHER PUBLICATIONS

Abedini. U.S. Appl. No. 62/682,601 provisional application corresponds to US20190380152 (Year: 2018).*
Extended European Search Report for European Application No. 22165784.4 dated May 6, 2022.
Intel Corporation "Sidelink Resource Allocation Mechanisms for NR V2X" R1-1808696; 3GPP TSG RAN WG1 Meeting #94; Gothenburg, Sweden; Aug. 20-24, 2018. 13 pages.
ITRI "Mechanisms and Resource Access for Sidelink Feedback" R1-1714198; 3GPP TSG-RAN WG1 Meeting #90; Prague, Czechia; Aug. 21-25, 2017. 4 pages.
Notice of Reasons for Refusal for Japanese Application No. 2021-513222 dated Apr. 19, 2022. 10 pages with English translation.
Notification of Reason for Refusal for Korean Application No. 10-2021-7008705 dated May 9, 2022. 11 pages with English translation.
EPO, Extended European Search Report for European Patent Application No. 18934484.9, dated Jun. 16, 2021. 7 pages.
Oppo, "Discussion of sidelink unicast, groupcast and broadcast for NR-V2X" R1-1808875; 3GPP TSG RAN WG1 Meeting #94; Gothenburg, Sweden, Aug. 20-24, 2018. 4 pages.
Catt "Carrier configuration and carrier selection in eV2X CA" R2-1708052; 3GPP TSG RAN WG2 #99; Berlin, Germany; Aug. 21-25, 2017. 4 pages.
First Office Action for Chinese Application No. 2021103935966 dated Jul. 11, 2022. 15 pages with English translation.
Huawei et al. "Sidelink physical layer structure and procedure for NR V2X" R1-1808093; 3GPP TSG RAN WG1 Meeting #94; Gothenburg, Sweden; Aug. 20-24, 2018. 6 pages.
Intel Corporation "Support of Sidelink Unicast, Groupcast and Broadcast Modes for NR V2X Communication" R1-1808693; 3GPP TSG RAN WG1 Meeting #94; Gothenburg, Sweden; Aug. 20-24, 2018. 7 pages.
Lenovo et al. "Sidelink feedback information" R1-1707773; 3GPP TSG RAN WG1 Meeting #89; Hangzhou, P.R. China; May 15-19, 2017. 3 pages.
LG Electronics "Status Report to TSG" RP-181637; 3GPP TSG RAN Meeting #81; Gold Coast, Australia; Sep. 10-13, 2018. 11 pages.
NEC "Resource collision detection and handling" R1-162431; 3GPP TSG RAN WG1 Meeting #84bis; Busan, South Korea; Apr. 11-15, 2016. 4 pages.
Second Office Action for Chinese Application No. 2021103935966 dated Sep. 28, 2022. 12 pages with English translation.
ZTE "Resource scheme of FeD2D Relay" R1-1712918; 3GPP TSG RAN WG1 Meeting #90; Prague, Czech Republic; Aug. 21-25, 2017. 5 pages.
ZTE "Sidelink Feedback of FeD2D Relay" R1-1712921; 3GPP TSG RAN WG1 Meeting #90; Prague, Czech Republic; Aug. 21-25, 2017. 6 pages.
LG Electronics, "Discussion on Feedback Information on Sidelink", 3GPP TSG RAN WG1 Meeting #90, R1-1713118, Aug. 25, 2017.
Huawei, et al., "Feedback Information for Sidelink Link Adaptation", 3GPP TSG RAN WG1 Meeting #90, R1-1712136, Aug. 25, 2017.
Huawei, et al., "Support for UE Cooperation in NR", 3GPP TSG RAN WG1 Meeting #85, R1-164379, May 27, 2016.
International Search Report dated Jun. 17, 2019 cited in PCT/CN2018/106048.
Examination Report No. 1 for Australian Application No. 2018441890 dated Oct. 21, 2021. 3 pages.
Examination Report for Indian Application No. 202117011261 dated Feb. 23, 2023. 6 pages with English translation.
Notice of Final Rejection for Korean Application No. 10-2021-7008705 dated Mar. 1, 2023. 6 pages with English translation.
Notice of Final Rejection for Korean Application No. 10-2021-7008705 dated Nov. 9, 2022. 6 pages with English translation.
Office Action for Taiwanese Application No. 108132870 dated Nov. 1, 2022. 19 pages with English translation.
Third Office Action for Chinese Application No. 2021103935966 dated Dec. 7, 2022. 7 pages with English translation.
Notice of Reasons for Refusal for Japanese Application No. 2022-147715 dated Oct. 6, 2023. 13 pages with English translation.
Trial Decision on Appeal against Decision to Reject Application for Korean Application No. 10-2021-7008705 dated Nov. 29, 2023. 34 pages with English translation.

* cited by examiner

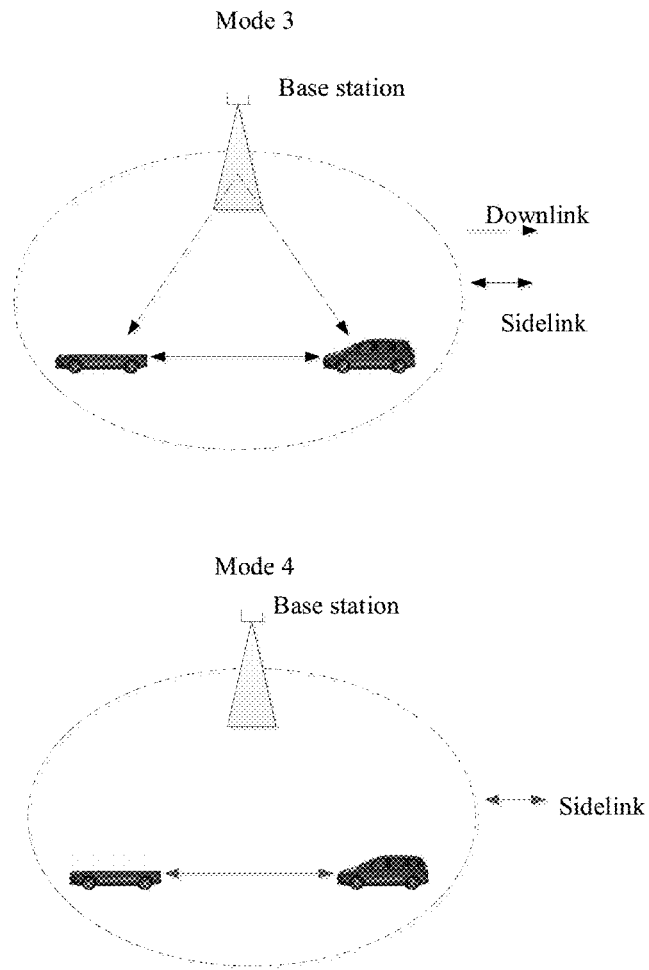

A first terminal device receives a first sidelink transmission channel sent by a second terminal device and the first sidelink transmission channel is used for transmitting a first message — 210

The first terminal device sends a second sidelink transmission channel to the second terminal device in response to the first message, the second sidelink transmission channel is used for transmitting the second message and the second message is a feedback message of the first message — 220

A second terminal device sends a first sidelink transmission channel to a first terminal device, wherein the first sidelink transmission channel is used for transmitting a first message — 310

The second terminal device receives a second sidelink transmission channel sent by the first terminal device, and the second sidelink transmission channel is used for transmitting a second message, wherein the second message is a feedback message of the first message — 320

FIG. 3

Start

400

A network device configures a transmission resource set to a terminal device group in an Internet of Vehicles, wherein the transmission resource set is used for at least one first terminal device in the terminal device group to send a feedback message to a second terminal device in the group — 410

End

FIG. 4

Terminal device 500

Communication unit — 510

Processing unit — 520

FIG. 5

COMMUNICATION METHOD, TERMINAL DEVICE AND NETWORK DEVICE

CROSS-REFERENCE TO RELATED APPLICATIONS

The present application is a continuation application of International PCT Application No. PCT/CN2018/106048, having an international filing date of Sep. 17, 2018, the contents of the above-identified application is hereby incorporated by reference.

TECHNICAL FIELD

Implementations of the present application relate to the technical field of communication, and in particular to a communication method, a terminal device and a network device.

BACKGROUND

A Vehicle-to-Everything system is based on Sidelink (SL) transmission technology, and adopts a mode of Device-to-Device direct communication. Therefore, the system has higher spectrum efficiency and lower transmission delay.

In a New Radio (NR) system, requirements on transmission reliability are higher.

How to achieve transmission reliability of a system using the Device-to-Device mode for communication is a problem to be solved urgently.

SUMMARY

Implementations of the present application provide a communication method and a communication device, which can achieve transmission reliability of a system using a Device-to-Device mode for communication.

In a first aspect, a communication method is provided, including: receiving, by a first terminal device, a first sidelink transmission channel sent by a second terminal device, wherein the first sidelink transmission channel is used for transmitting a first message; and sending, by the first terminal device, a second sidelink transmission channel to the second terminal device in response to the first message, wherein the second sidelink transmission channel is used for transmitting a second message, and the second message is a feedback message of the first message.

In a second aspect, a communication method is provided, including: sending, by a second terminal device, a first sidelink transmission channel to a first terminal device, wherein the first sidelink transmission channel is used for transmitting a first message; and receiving, by the second terminal device, a second sidelink transmission channel sent by the first terminal device, wherein the second sidelink transmission channel is used for transmitting a second message, and the second message is a feedback message of the first message.

In a third aspect, a wireless communication method is provided, including: configuring, by a network device, a first transmission resource set to a first terminal device group, wherein the first transmission resource set is used for at least one first terminal device in the first terminal device group to send a feedback message to a second terminal device in the group.

In a fourth aspect, a terminal device is provided, which is used for performing the method in the first aspect or the second aspect described above.

Specifically, the terminal device includes function modules for implementing the method in the first aspect or the second aspect described above.

In a fifth aspect, a network device is provided for executing the method in the third aspect.

Specifically, the network device includes function modules for implementing the method in the third aspect described above.

In a sixth aspect, a terminal device is provided. The terminal device includes a processor and a memory. The memory is configured to store a computer program, and the processor is configured to call and run the computer program stored in the memory to execute the method in the first aspect or the second aspect described above.

In a seventh aspect, a network device is provided. The network device includes a processor and a memory. The memory is configured to store a computer program, and the processor is configured to call and run the computer program stored in the memory to execute the method in the third aspect described above.

In an eighth aspect, a chip is provided for implementing the method in the first aspect or the second aspect described above.

Specifically, the chip includes a processor configured to call and run a computer program from a memory and a device having the chip installed therein executes the method in the first aspect or the second aspect described above.

In a ninth aspect, a chip is provided for implementing the method in the third aspect described above.

Specifically, the chip includes a processor configured to call and run a computer program from a memory and a device having the chip installed therein executes the method in the first aspect or the second aspect described above.

In a tenth aspect, a computer-readable storage medium is provided for storing a computer program that causes a computer to execute the method in the first aspect or the second aspect described above.

In an eleventh aspect, a computer-readable storage medium is provided for storing a computer program that causes a computer to execute the method in the third aspect described above.

In a twelfth aspect, a computer program product is provided, including computer program instructions that cause a computer to execute the method in the first or second aspect described above.

In a thirteenth aspect, a computer program product is provided, including computer program instructions that cause a computer to execute the method in the third aspect described above.

In a fourteenth aspect, a computer program is provided, when being run on a computer, causes the computer to execute the method in the first aspect or the second aspect described above.

In a fifteenth aspect, a computer program is provided, when being run on a computer, causes the computer to execute the method in the third aspect described above.

Therefore, in an implementation of the present application, after a first terminal device receives a first sidelink transmission channel for transmitting a first message sent by a second terminal device, the first terminal device sends to the second terminal device a second sidelink transmission channel for transmitting a feedback message, so that the second terminal device may perform transmission of subsequent messages based on the feedback message, which may improve a transmission reliability of a system using a device-to-device mode for communication. Furthermore, using the sidelink transmission channel to transmit the feedback message brings a higher spectral efficiency and a lower transmission delay.

BRIEF DESCRIPTION OF DRAWINGS

FIG. 1 is a system architecture diagram under modes 3 and 4 in a Internet of Vehicles according to an implementation of the present application.

FIG. 2 is a schematic flowchart of a communication method according to an implementation of the present application.

FIG. 3 is a schematic flowchart of another communication method according to an implementation of the present application.

FIG. 4 is a schematic flowchart of another communication method according to an implementation of the present application.

FIG. 5 is a schematic block diagram of a terminal device according to an implementation of the present application.

DETAILED DESCRIPTION

Figure 6:
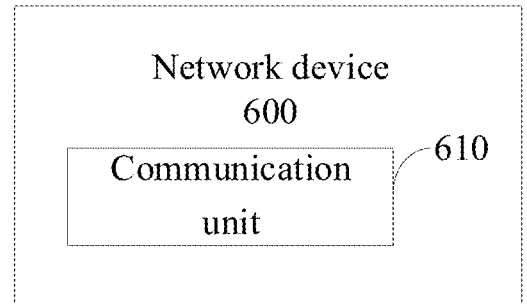
FIG. 6 is a schematic block diagram of another terminal device according to an implementation of the present application.

The technical solution in implementations of the present application will be described below with reference to the accompanying drawings in implementations of the present application. It is apparent that the implementations described are just some implementations of the present application, but not all implementations of the present application. Based on the implementations in the present application, all other implementations achieved by a person of ordinary skill in the art without paying an inventive effort shall fall within the protection scope of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system, etc.

The network devices mentioned in the implementations of the present application may be devices that communicate with terminal devices (or communication terminals, terminals). The network device may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. Optionally, the terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

In the 3rd Generation Partnership Project (3GPP) Rel (Release)-14, two transmission modes, i.e., mode 3 and mode 4 are defined for the vehicle networking technology, i.e., a Vehicle to Everything (V2X) technology.

As shown in FIG. 1, in the mode 3, transmission resources of a vehicle terminal are allocated by a base station, and the vehicle terminal transmits data on the side link according to resources allocated by the base station; the base station may allocate to the terminal a resource for a single transmission or a resource for semi-static transmission.

As shown in FIG. 1, in the mode 4, a vehicle terminal adopts a transmission mode of sensing plus reservation. The vehicle terminal acquires a set of available transmission resources in a resource pool by sensing, and the terminal randomly selects a resource from the set for data transmission. Since services in the V2X have a periodic characteristic, the terminal usually adopts a semi-static transmission mode, that is, after selecting a transmission resource, the terminal will continuously use the resource in multiple transmission periods, thus reducing probabilities of resource re-selection and resource conflict. The terminal will carry information of a resource reserved for next transmission in the control information of a current transmission, so that other terminals can determine whether a resource is reserved and used by the user by detecting the control information of the user, thus achieving a purpose of reducing resource conflicts.

In NR-V2X, various transmission modes may be supported, such as unicast, groupcast and broadcast. In the groupcast transmission, there may be a group head, other terminal devices may be group members, the group head may send groupcast messages to the group members, multiple group members need to send feedback information to the group head, and the group head may adjust a modulation and coding scheme (MCS) and determine whether a retransmission is needed according to the feedback from the multiple group members.

Below, an implementation of the present application provides an implementation of how to send a feedback message.

It should be understood that implementations of the present application may be applied to V2X systems and other Device to Device (D2D) systems, which are not limited in the present application.

FIG. 2 is a schematic flow chart of a wireless communication method 200 provided by an implementation of the present application. The method 200 includes at least part of the following contents.

In 210, a first terminal device receives a first sidelink transmission channel sent by a second terminal device, wherein the first sidelink transmission channel is used for transmitting a first message.

Optionally, the first terminal device and the second terminal device in an implementation of the present application may belong to a same terminal device group, wherein the terminal devices in one terminal device group may communicate with each other, and the terminal device group may include at least one group head (the second terminal device or a third terminal device in an implementation of the present application may be the group head), which may send groupcast or unicast messages to other members in the group (for example, the first terminal device in an implementation of the present application). The members in the group (for example, resource allocation and application layer message notification, etc.) may be managed by the group head.

Optionally, the group members (including the group head) in the terminal device group may communicate with other group members by unicast or groupcast. A channel adopted among the group members may be a sidelink transmission channel, for example, a Physical sidelink control channel (PSCCH), a physical sidelink shared channel (PSSCH), or a physical sidelink feedback channel.

Optionally, a channel through which the group head sends the messages to other group members may be a PSCCH or PSSCH, a channel through which other group members send the messages to the group head may be a PSSCH, and the channel for sending messages between the group members may be a PSSCH.

Optionally, the first sidelink transmission channel is used for transmitting a reference signal, and the first terminal device performs a channel measurement according to the first sidelink transmission channel, such as measuring a channel state, a channel quality, a reference signal received power (RSRP), and a received signal strength indication (RSSI), etc.

Optionally, in an implementation of the present application, one terminal device may belong to multiple terminal device groups, and the one terminal device group may be used as a group head in all of the multiple terminal device groups, or may be used as a group head in some terminal device groups, or may be used as a group head in none of the multiple terminal device groups.

Optionally, in an implementation of the present application, the group members (including the group head) in the terminal device group may each carry a group identifier when communicating with each other.

Optionally, the first terminal device and the second terminal device in an implementation of the present application may be in a cell or outside a cell.

Optionally, in an implementation of the present application, the first sidelink transmission channel may be sent by unicast, groupcast or broadcast.

In 220, in response to the first message, the first terminal device sends a second sidelink transmission channel to the second terminal device, wherein the second sidelink transmission channel is used for transmitting a second message, and the second message is a feedback message of the first message.

Optionally, in an implementation of the present application, the feedback message includes at least one piece of the following information: acknowledgement (ACK)/negative acknowledgment (NACK) information, channel quality indication information, channel state information, beam indication information, precoding matrix indication information, rank information or power information.

For example, when data is sent in the first message, at this time, the first terminal device may feedback to the second terminal device the ACK or NACK information for indicating whether the data is successfully received.

For example, a reference signal (e.g., a synchronization signal block, etc.) may be sent in the first message, and at this time, the second terminal device may measure the channel quality or channel state based on the reference signal, and the second terminal device may feedback the channel quality indication information to the first terminal device.

For example, the second terminal device may send the first message through multibeams, then the first terminal device may measure the beams and feedback a more optimal beam to the second terminal device.

For example, the first terminal device may feedback power information through the received first message, wherein the power information may indicate a power magnitude of the message that the second terminal device is expected to send later.

For example, the first terminal device may feedback precoding matrix indication information or rank information through the received first message, and indicate the precoding matrix, rank or the like that the second terminal device is expected to use for sending the messages later.

Optionally, the second sidelink transmission channel is used for transmitting a sequence which carries the second message. For example, the first terminal device receives the first message sent by the second terminal device, and the first terminal device sends an ACK or NACK message to the second terminal device, i.e., the second message. The first terminal device may send one sequence to the second terminal device, and the sequence may be used for carrying the ACK or NACK message.

Optionally, in an implementation of the present application, the first terminal device may determine a first transmission resource, and send the second sidelink transmission channel to the second terminal device on the first transmission resource.

Optionally, in an implementation of the present application, the first terminal device determines a first transmission resource according to at least one of the following: an identifier of the first terminal device, a group identifier of the first terminal device group, first indication information which is used for indicating the first transmission resource and is sent to the first terminal device by another device except the first terminal device, or preconfigured information, wherein the first terminal device group is a terminal device group including the first terminal device and the second terminal device.

In the above, the other device may be the second terminal device, the third terminal device or the network device. Here, the first terminal device, the second terminal device and the third terminal device may belong to the same terminal device group, that is, they all belong to the first terminal device group, wherein the third terminal device may be the group head, and the third terminal device may be used for allocating the first transmission resource which is used for the first terminal device to send the feedback message to the second terminal device.

When the first indication information is sent to the first terminal device by the second terminal device or the third terminal device, the first indication information is carried in the PSCCH or PSSCH.

When the first indication information is sent by the network device to the first terminal device, the first indication information is carried in DCI or RRC signaling.

In the above, the first indication information may be used for indicating the first transmission resource. In an implementation mode, the first indication information may include information of a resource location of the first transmission resource (for example, a used time unit index, symbol index, or subband index, etc.).

Optionally, in an implementation of the present application, the first transmission resource may belong to the first transmission resource set. The first transmission resource set is optionally used for a terminal device in the first terminal device group to send the feedback message to the second terminal device, wherein the first terminal device group includes the first terminal device.

The first transmission resource set mentioned in an implementation of the present application may be semi-static or dynamically configured, and the resources in the first transmission resource set may be periodic or aperiodic.

It should be understood that the first transmission resource set may be used for sending the feedback messages as well as other messages, which is not specifically limited in the implementations of the present application.

It should also be understood that even if the first transmission resource belongs to the first transmission resource set, the first terminal device may not know which transmission resources are specifically included in the first transmission resource set. For example, the second terminal device or the network device may indicate the resource location of the first transmission resource to the first terminal device, the first terminal device may use the transmission resource at the resource location for transmitting the second sidelink transmission channel.

Or, the first terminal device determines the first transmission resource from the first transmission resource set.

That is, the first terminal device may acquire the first transmission resource set and determine the first transmission resource from the first transmission resource set.

Optionally, in an implementation of the present application, the first terminal device determines the first transmission resource from the first transmission resource set according to at least one of the following: the identifier of the first terminal device, the group identifier of the first terminal device group, or second indication information sent to the first terminal device by another device except the first terminal device (e.g., the second terminal device, the third terminal device or the network device). In the above, the third terminal device is a terminal device other than the first terminal device and the second terminal device, and the first terminal device, the second terminal device and the third terminal device may belong to the same terminal device group, that is, they all belong to the first terminal device group.

In the above, the identifier of the first terminal device is an identifier of the first terminal device in the first terminal device group, or the identifier of the first terminal device is a cell radio network temporary identifier of the first terminal device, wherein the identifier of the first terminal device in the first terminal device group is allocated by a network side or the second terminal device, and the cell radio network temporary identifier of the first terminal device is allocated by a network side device. For example, the first terminal device group includes the first terminal device, the second terminal device and the third terminal device, wherein the second terminal device is the group head of the first terminal device group, and the first and third terminal devices are the group members of the first terminal device group, the identifier of the first terminal device in the first terminal device group may be allocated by the group head, i.e., the second terminal device.

In an implementation mode, the first terminal device may determine the first transmission resource N_k in the following way: N_k=f(k_id, g_id, N);

wherein k_id represents the identification information of the first terminal device (at this time, the identification information may be the identifier of the first terminal device in the first terminal device group), g_id represents the group identification information of the first terminal device group, N represents the total number of resources in the first transmission resource set, and f(x,y,z) represents the function operation composed of variables x,y,z. It should be understood that the function operation may only include some of the variables, for example, only k_id and N.

Therefore, the first terminal device determines the first transmission resource from the first transmission resource set according to its own identification information and/or device group identification information, and different terminal devices select different transmission resources, thus avoiding transmission conflicts among feedback resources of multiple terminal devices.

Specifically, the first transmission resource set includes N transmission resources numbered [0,N−1], and the group includes A members numbered [0,A−1], A−1<=N, wherein 0 represents the group head and the numbers of other group members are [1,A−1]. The first terminal device determines the first transmission resource as follows: N_k=mod(k,N), where k represents an intra-group identifier of the first terminal device, N_k represents the first transmission resource determined by the first terminal device, and mod ( ) represents a remainder operation.

For example, there are 8 members included in a group, including one group head and seven group members. The group ids of members in the group are [0,7], where the intra-group id 0 represents the group head and the intra-group ids 1-7 represent seven group members respectively. The group head sends a groupcast message to the group members, and the seven group members may send feedback information to the group head. The transmission resource set includes ten transmission resources, so using the above formula, it can be calculated that the feedback resources of seven group members respectively correspond to 1-7 transmission resources in the first resource set.

In another implementation mode, the first terminal device acquires the second indication information from the second terminal device or the network side; based on the second indication information, the first terminal device determines the first transmission resource from the first transmission resource set.

In the above, the second indication information may come from the second terminal device. That is, the second terminal device (the group head) indicates the feedback resources used by the first terminal device. The second terminal device allocates different feedback resources to different group members, thus avoiding conflicts between feedback information among the group members.

Specifically, the second terminal may carry the second indication information through the PSCCH, PSSCH, etc.

Specifically, the second terminal device may send the second indication information while sending the first message, that is, the second indication information may be carried in the first message.

Or, the second indication information comes from the network device, that is, the network device allocates the feedback resources among the group members. In a transmission mode where the network device allocates sidelink transmission resources, the network device allocates to the second terminal device transmission resources for sending data, and further allocates to other group members transmission resources for sending feedback information. The network device allocates different transmission resources to different group members, which may avoid the problem of transmission conflict between feedback information sent by the group members. Specifically, the network device may send the second indication information through the DCI, RRC signaling, etc.

Optionally, the second indication information may be sent by the network device when the first terminal device is located in the cell, and the second indication information may be sent by the second terminal device when the first terminal device is located outside the cell.

Optionally, the second indication information includes the index information of the first transmission resource in the first transmission resource set. Therefore, the first terminal device may determine the first transmission resource from the first transmission resource set based on the index information.

Optionally, the second indication information may carry the identification information of the first transmission resource set or the information of the corresponding group identification.

For example, in a case that one terminal device may belong to multiple terminal device groups, the one terminal device may also correspond to multiple first transmission resource sets at this time, and the second indication information carries the identification information of the first transmission resource set or the identification information of the corresponding terminal device group, which may indicate which first transmission resource set the first transmission resource belongs to or used for communication of which terminal device group.

Optionally, in an implementation of the present application, the first transmission resource set may be preconfigured on the first terminal device based on a protocol.

Optionally, in an implementation of the present application, the first terminal device receives third indication information from other device (for example, the network device or the second terminal device or the third terminal device), wherein the third indication information is used for indicating the first transmission resource set.

Specifically, the second terminal device may send the third indication information while sending the first message, that is, the third indication information may be carried in the first message.

For example, when the second terminal device may send data to the members in the group, it may indicate the first transmission resource set at the same time, for example, sending the data at a time unit n, and indicating that a time unit n+k is the first transmission resource set. N subbands are included on the time unit n+k, and each subband may be used as one feedback channel, so transmission resources of N feedback channels are included in the time unit n+k.

Optionally, when the third indication information is sent to the first terminal device by the second terminal device or the third terminal device, the third indication information is carried in a physical sidelink control channel (PSCCH) or a physical sidelink shared channel (PSSCH). Or, the network device may send the third indication information to indicate the first transmission resource set.

For example, the network device may preconfigure a series of transmission resource sets to the first terminal device, for example, the last time unit in each wireless frame is used as the transmission resource set. When the second terminal device transmits data in other time units in the wireless frame, the group members take the last time unit of the wireless frame as the transmission resource set after receiving the data, and determine the first transmission resource from the last time unit of the wireless frame and send the feedback information. At this time, the resources corresponding to one time unit may be called as one transmission resource set, and at this time, the transmission resource set here may be called as a periodic transmission resource set.

Or, the third terminal device may send the third indication information to the members in the group for indicating the first transmission resource set, wherein the third terminal device may be the group head. The first transmission resource set may be used for the members in the group to send the feedback messages to one or more terminal devices in the group.

In the above, the third indication information further carries the group identifier of the terminal device group, which is used for indicating that the first transmission resource set corresponds to the terminal device group.

For example, since one terminal device (e.g., the first terminal device) may belong to multiple terminal device groups, in this case, the group identifier may be carried in the third indication information, indicating the first transmission resource set indicated by the third indication information is used for communication of which terminal device group.

In the above, when the first transmission resource set is configured by the second terminal device to the first terminal device, the network device may configure the first transmission resource set to the second terminal device, and then the second terminal device configures the first transmission resource set to other members in the group, or, the second terminal device may directly configure the transmission resources to other members in the group based on the first transmission resource set, without need of configuring the first transmission resource set to other group members.

Optionally, when the first terminal device is located in the cell, the network device may configure the first transmission resource set to the first terminal device, and when the first terminal device is located outside the cell, the second terminal device may configure the first transmission resource set to the first terminal device.

Optionally, the network device may transmit the first indication information, the second indication information, or the third indication information through downlink control information (DCI) or radio resource control (RRC) signaling.

Optionally, in an implementation of the present application, the resources in the first transmission resource set are located in the same time unit.

Specifically, when a group member sends the feedback messages to the group head, it does not need to receive the feedback messages sent by other group members, so there is no problem of half-duplex, so the feedback channels of all group members are located in the same time unit, which may minimize an influence of the half-duplex.

Optionally, in an implementation of the present application, the time unit where the first transmission resource is located is not used for the first terminal device to send the data to the third terminal device in the first terminal device group, wherein the third terminal device is any one terminal device that sends feedback information to the second terminal device in the time unit where the first transmission resource is located.

Optionally, in an implementation of the present application, the time unit may be a subframe, a time slot, a short transmission time interval (sTTI), or a time domain symbol.

FIG. 3 is a schematic flowchart of a communication method 300 according to an implementation of the present application. The method 300 includes at least part of the following contents.

In 310, a second terminal device sends a first sidelink transmission channel to a first terminal device, wherein the first sidelink transmission channel is used for transmitting a first message.

In act 320, the second terminal device receives a second sidelink transmission channel sent by the first terminal device, and the second sidelink transmission channel is used for transmitting a second message, wherein the second message is a feedback message of the first message.

Optionally, in an implementation of the present application, the second terminal device utilizes resources in a first transmission resource set, and the second terminal device receives the second sidelink transmission channel sent by the first terminal device.

In the above, the second terminal device may determine which terminal device the feedback message belongs to, based on a resource location of the received feedback message. At this time, the feedback message may not carry identification information of the first terminal device.

For example, based on the identification information of the first terminal device, it can be determined that the transmission resource for sending the feedback message by the first terminal device is a first transmission resource, and then the feedback message received on the first transmission resource belongs to the first terminal device.

For example, the second terminal device may indicate the first transmission resource for sending the feedback message to the first terminal device, and then the feedback message received on the first transmission resource belongs to the first terminal device.

Or, the feedback message may further carry the identification information of the first terminal device, and then the second terminal device may determine that the feedback message belongs to the first terminal device based on the identification information of the first terminal device carried in the feedback message.

Optionally, in an implementation of the present application, the second terminal device sends first indication information to the first network device, wherein the first indication information is used for indicating the first transmission resource.

Optionally, the first transmission resource belongs to the first transmission resource set.

In the above, the first indication information may include the resource location of the first transmission resource, and at this time, the first transmission resource set may be known or unknown to the first terminal device. For example, the first indication information indicates the location information of specific time domain resource and frequency domain resource of the first transmission resource, and the first transmission resource may be determined according to the first indication information.

Optionally, in an implementation of the present application, the first indication information is carried in a PSCCH or a PSSCH.

Optionally, in an implementation of the present application, the second terminal device sends second indication information to the first terminal device, wherein the second indication information is used for indicating an index of the first transmission resource in the first transmission resource set.

Optionally, in an implementation of the present application, the second indication information is carried in the PSCCH or PSSCH.

Optionally, in an implementation of the present application, the second terminal device sends third indication information to the first terminal device, wherein the third indication information is used for indicating the first transmission resource set.

In the above, the third indication information further carries a group identifier of the first terminal device group, which is used for indicating that the first transmission resource set corresponds to the first terminal device group.

Optionally, in an implementation of the present application, the third indication information is carried in the PSCCH or PSSCH.

Optionally, in an implementation of the present application, the second terminal device receives fourth indication information sent by a network side, wherein the fourth indication information is used for indicating the first transmission resource set.

In the above, the fourth indication information further carries the group identifier of the first terminal device group, which is used for indicating that the first transmission resource set corresponds to the first terminal device group.

Optionally, in an implementation of the present application, the fourth indication information is carried in downlink control information (DCI) or radio resource control (RRC) signaling.

Optionally, in an implementation of the present application, the resources in the first transmission resource set are located in a same time unit.

Optionally, in an implementation of the present application, the feedback message includes at least one piece of the following information: acknowledgement (ACK)/negative acknowledgement (NACK) information, channel quality indication information, channel state information, beam indication information, precoding matrix indication information, rank information and power information.

Optionally, in an implementation of the present application, the first sidelink transmission channel is sent by unicast or groupcast.

FIG. 4 is a schematic flowchart of a communication method 400 according to an implementation of the present application. The method 400 includes at least part of the following contents.

In 410, a network device configures a first transmission resource set to a first terminal device group, wherein the first transmission resource set is used for at least one first terminal device in the first terminal device group to send a feedback message to a second terminal device in the group through a sidelink transmission channel.

Optionally, in an implementation of the present application, the network device sends second indication information to the first terminal device, wherein the second indication information is used for indicating the first transmission resource in the first transmission resource set, and the first transmission resource is used for the first terminal device to send the feedback message to the second terminal device through the sidelink transmission channel. In the above, the second indication information may carry index information of the first transmission resource in the first transmission resource set.

Optionally, in an implementation of the present application, the second indication information is carried in downlink control information (DCI) or radio resource control (RRC) signaling.

Optionally, in an implementation of the present application, the network device sends to the first terminal device third indication information for indicating the first transmission resource set.

In the above, the third indication information further carries a group identifier of the first terminal device group, which is used for indicating that the first transmission resource set corresponds to the first terminal device group.

Optionally, in an implementation of the present application, the third indication information is carried in the downlink control information (DCI) or radio resource control (RRC) signaling.

Optionally, in an implementation of the present application, the network device sends to the second terminal device fourth indication information for indicating the first transmission resource set.

Optionally, in an implementation of the present application, the fourth indication information further carries the group identifier of the first terminal device group, which is used for indicating that the first transmission resource set corresponds to the first terminal device group.

Optionally, in an implementation of the present application, the fourth indication information is carried in the downlink control information (DCI) or radio resource control (RRC) signaling.

It should be understood that the network device may also indicate the first transmission resource to the first terminal device without indicating the first transmission resource set. At this time, the first transmission resource set may be preconfigured on the first terminal device, or the second terminal device may configure the first transmission resource set to the first terminal device.

The communication methods of implementations of the present application have been described above mainly on the side of the first terminal device, the second terminal device and the network device, but it should be understood that the above methods 200, 300 and 400 may be used in combination.

FIG. 5 is a schematic block diagram of a terminal device 500 according to an implementation of the present application. The terminal device 500 may be used in wireless communication of Internet of Vehicles, and the terminal device 500 is a first terminal device. The terminal device 500 includes a communication unit 510 configured to receive a first sidelink transmission channel sent by a second terminal device, wherein the first sidelink transmission channel is used for transmitting a first message; and send a second sidelink transmission channel to the second terminal device in response to the first message, wherein the second sidelink transmission channel is used for transmitting a second message, and the second message is a feedback message of the first message.

Optionally, in an implementation of the present application, the terminal device 500 further includes a processing unit 520 configured to determine a first transmission resource; the communication unit 510 is further configured to send the second sidelink transmission channel to the second terminal device on the first transmission resource.

Optionally, in an implementation of the present application, the processing unit 520 is further configured to determine the first transmission resource according to at least one of the following: an identifier of the first terminal device, a group identifier of a first terminal device group, first indication information sent by another device except the first terminal device to the first terminal device, or preconfigured information, wherein the first terminal device group is a terminal device group which includes the first terminal device and the second terminal device.

Optionally, in an implementation of the present application, the processing unit 520 is further configured to acquire a first transmission resource set; and determine the first transmission resource from the first transmission resource set.

Optionally, in an implementation of the present application, the processing unit 520 is further configured to determine the first transmission resource from the first transmission resource set according to at least one of the following: the identifier of the first terminal device, the group identifier of the first terminal device group, or second indication information sent to the first terminal device by another device except the first terminal device.

Optionally, in an implementation of the present application, the identifier of the first terminal device is an identifier of the first terminal device in the first terminal device group, or the identifier of the first terminal device is a cell radio network temporary identifier of the first terminal device.

Optionally, in an implementation of the present application, the processing unit 520 is further configured to determine the first transmission resource $N\_k$ in the following manner: $N\_k=f(k\_id, g\_id, N)$;

wherein $k\_id$ represents identification information of the first terminal device, $g\_id$ represents group identification information of the first terminal device group, N represents a total number of resources in the first transmission resource set, and $f(x,y,z)$ represents a function operation composed of variables x,y,z.

Optionally, in an implementation of the present application, the communication unit 510 is further configured to:

acquire the second indication information from the second terminal device, the third terminal device, or a network side device; wherein the third terminal device is a terminal device other than the first terminal device and the second terminal device;

the processing unit 520 is further configured to:

determine the first transmission resource from the first transmission resource set based on the second indication information.

Optionally, in an implementation of the present application, the second indication information includes index information of the first transmission resource in the first transmission resource set.

Optionally, in an implementation of the present application, the first transmission resource set is preconfigured on the first terminal device based on a protocol.

Optionally, in an implementation of the present application, the communication unit 510 is further configured to: receive third indication information from another device, wherein the third indication information is used for indicating the first transmission resource set.

Optionally, in an implementation of the present application, the third indication information further carries the group identifier of the first terminal device group, which is used for indicating that the first transmission resource set corresponds to the first terminal device group.

Optionally, in an implementation of the present application, the resources in the first transmission resource set are located in the same time unit.

Optionally, in an implementation of the present application, when the first indication information is sent to the first terminal device by the second terminal device or the third terminal device in the first terminal device group, the first indication information is carried in a physical sidelink control channel (PSCCH) or a physical sidelink shared channel (PSSCH).

Optionally, in an implementation of the present application, when the first indication information is sent to the first terminal device by the network device, the first indication information is carried in downlink control information (DCI) or radio resource control (RRC) signaling.

Optionally, in an implementation of the present application, when the second indication information is sent to the first terminal device by the second terminal device or the third terminal device in the first terminal device group, the second indication information is carried in the physical sidelink control channel (PSCCH) or the physical sidelink shared channel (PSSCH).

Optionally, in an implementation of the present application, when the second indication information is sent to the first terminal device by the network device, the second indication information is carried in the downlink control information (DCI) or the radio resource control (RRC) signaling.

Optionally, in an implementation of the present application, when the third indication information is sent to the first terminal device by the second terminal device or the third terminal device in the first terminal device group, the third indication information is carried in the physical sidelink control channel (PSCCH) or the physical sidelink shared channel (PSSCH).

Optionally, in an implementation of the present application, when the third indication information is sent to the first terminal device by the network device, the third indication information is carried in the downlink control information (DCI) or the radio resource control (RRC) signaling.

Optionally, in an implementation of the present application, the second message includes at least one piece of the following information: acknowledgement (ACK)/negative acknowledgement (NACK) information, channel quality indication information, channel state information, beam indication information, precoding matrix indication information, rank information or power information.

Optionally, in an implementation of the present application, the first sidelink transmission channel is sent by unicast or groupcast.

It should be understood that the terminal device 500 may implement the corresponding operations implemented by the first terminal device in the method implementations of the present application, which will not be repeated here for brevity.

FIG. 6 is a schematic block diagram of a terminal device 600 according to an implementation of this application. The terminal device 600 may be used for wireless communication of Internet of Vehicles. The terminal device 600 is a second terminal device, and the terminal device 600 includes a communication unit 610, configured to:

send a first sidelink transmission channel to a first terminal device, wherein the first sidelink transmission channel is used for transmitting a first message; and receive a second sidelink transmission channel sent by the first terminal device, wherein the second sidelink transmission channel is used for transmitting a second message, and the second message is a feedback message of the first message.

Optionally, in an implementation of the present application, the communication unit 610 is further configured to receive, by using a first transmission resource, a second sidelink transmission channel sent by the first terminal device.

Optionally, in an implementation of the present application, the communication unit 610 is further configured for that: the second terminal device sends first indication information to the first terminal device, wherein the first indication information is used for indicating the first transmission resource.

Optionally, in an implementation of the present application, the first transmission resource belongs to a first transmission resource set.

Optionally, in an implementation of the present application, the communication unit 610 is further configured to send second indication information to the first terminal device, wherein the second indication information includes index information of the first transmission resource in the first transmission resource set.

Optionally, in an implementation of the present application, the communication unit 610 is further configured to send third indication information to the first terminal device, wherein the third indication information is used for indicating the first transmission resource set.

Optionally, in an implementation of the present application, the third indication information further carries a group identifier of the first terminal device group, which is used for indicating that the first transmission resource set corresponds to the first terminal device group.

Optionally, in an implementation of the present application, the communication unit 610 is further configured to receive fourth indication information sent by a network side, wherein the fourth indication information is used for indicating the first transmission resource set.

Optionally, in an implementation of the present application, the fourth indication information further carries the group identifier of the first terminal device group, which is used for indicating that the first transmission resource set corresponds to the first terminal device group.

Optionally, in an implementation of the present application, the resources in the first transmission resource set are located in a same time unit.

Optionally, in an implementation of the present application, the first indication information is carried in a physical sidelink control channel (PSCCH) or a physical sidelink shared channel (PSSCH).

Optionally, in an implementation of the present application, the second indication information is carried in the physical sidelink control channel (PSCCH) or the physical sidelink shared channel (PSSCH).

Optionally, in an implementation of the present application, the third indication information is carried in the physical sidelink control channel (PSCCH) or a physical sidelink shared channel (PSSCH).

Optionally, in an implementation of the present application, the fourth indication information is carried in downlink control information (DCI) or radio resource control (RRC) signaling.

Optionally, in an implementation of the present application, the feedback message includes at least one of the following information: acknowledgement (ACK)/negative acknowledgement (NACK) information, channel quality indication information, channel state information, beam indication information, precoding matrix indication information, rank information or power information.

Optionally, in an implementation of the present application, the first sidelink transmission channel is sent by unicast or groupcast.

It should be understood that the terminal device 600 may implement the corresponding operations implemented by the second terminal device in the method implementations in the present application, which will not be repeated here for brevity.

Figure 7:
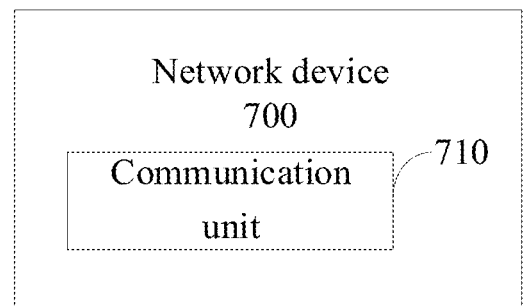
FIG. 7 is a schematic block diagram of a network device according to an implementation of the present application.

FIG. 7 is a schematic block diagram of a network device 700 according to an implementation of this application. The network device 700 is used for wireless communication of Internet of Vehicles, and the network device 700 includes a communication unit 710, configured to:

configure a first transmission resource set to a first terminal device group, wherein the first transmission resource set is used for at least one first terminal device in the first terminal device group to send a feedback message to a second terminal device in the group through a sidelink transmission channel.

Optionally, in an implementation of the present application, the communication unit 710 is further configured to:

send second indication information to the first terminal device, wherein the second indication information is used for indicating an index of a first transmission resource in the first transmission resource set, and the first transmission resource is used for the first terminal device to send the feedback message to the second terminal device through the sidelink transmission channel.

Optionally, in an implementation of the present application, the communication unit 710 is further configured to send to the first terminal device third indication information for indicating the first transmission resource set.

Optionally, in an implementation of the present application, the third indication information further carries a group identifier of the first terminal device group, which is used for indicating that the first transmission resource set corresponds to the first terminal device group.

Optionally, in an implementation of the present application, the communication unit 710 is further configured to send to the second terminal device fourth indication information for indicating the first transmission resource set.

Optionally, in an implementation of the present application, the fourth indication information further carries the group identifier of the first terminal device group, which is used for indicating that the first transmission resource set corresponds to the first terminal device group.

Optionally, in an implementation of the present application, the second indication information is carried in downlink control information (DCI) or radio resource control (RRC) signaling.

Optionally, in an implementation of the present application, the third indication information is carried in the downlink control information (DCI) or the radio resource control (RRC) signaling.

Optionally, in an implementation of the present application, the fourth indication information is carried in the downlink control information (DCI) or the radio resource control (RRC) signaling.

It should be understood that the network device 700 may implement the corresponding operations implemented by the network device in the method implementations of the present application, which will not be repeated here for brevity.

Figure 8:
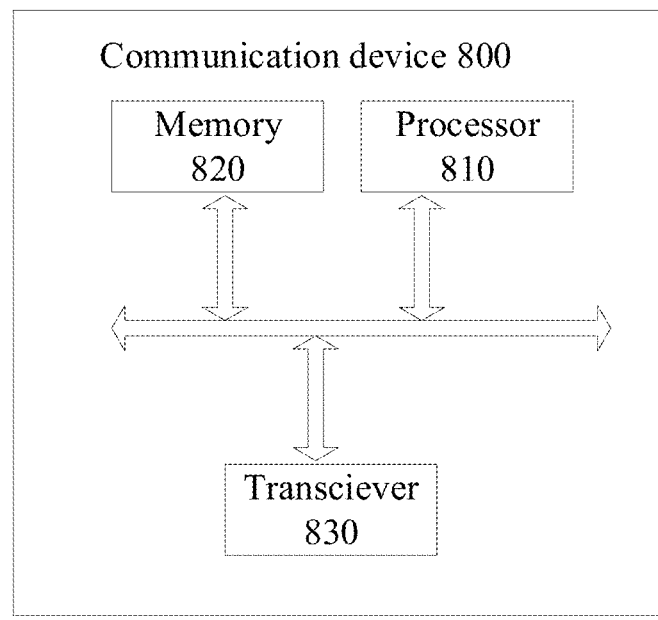
FIG. 8 is a schematic block diagram of a communication device according to an implementation of the present application.

FIG. 8 is a schematic diagram of structure of a communication device 800 according to an implementation of the present application. A communication device 800 shown in FIG. 8 includes a processor 810, wherein the processor 810 may call and run a computer program from a memory to implement the methods in the implementations of the present application.

Optionally, as shown in FIG. 8, the communication device 800 may further include a memory 820, wherein the processor 810 may call and run a computer program from the memory 820 to implement the methods in the implementations of the present application.

In the above, the memory 820 may be a separate device independent of the processor 810 or may be integrated in the processor 610.

Optionally, as shown in FIG. 8, the communication device 800 may further include a transceiver 830, and the processor 810 may control the transceiver 830 to communicate with other devices. Specifically, the transceiver 830 may send information or data to other devices or receive information or data sent by other devices.

In the above, the transceiver 830 may include a transmitter and a receiver. The transceiver 830 may further include antennas, and the number of the antennas may be one or more.

Optionally, the communication device 800 may specifically be a network device of an implementation of the present application, and the communication device 800 may implement the corresponding processes implemented by the network device in various methods of the implementations of the present application, which will not be repeated here for brevity.

Optionally, the communication device 800 may specifically be a terminal device (for example, a first terminal device or a second terminal device) of an implementation of the present application, and the communication device 800 may implement the corresponding processes implemented by the terminal device in various methods of the implementation of the present application, which will not be repeated here for brevity.

Figure 9:
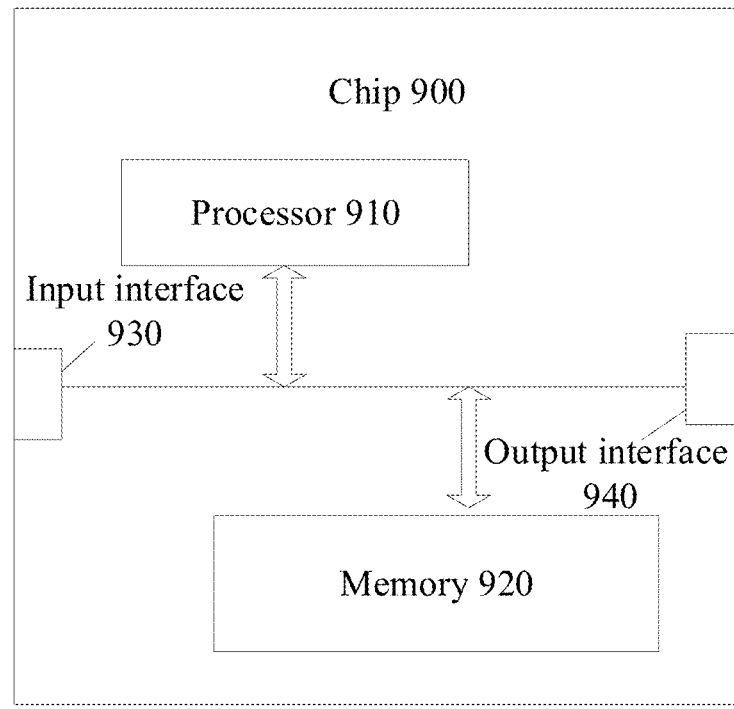
FIG. 9 is a schematic block diagram of a chip according to an implementation of the present application.

FIG. 9 is a schematic diagram of a structure of a chip of an implementation of the present application. A chip 900 shown in FIG. 9 includes a processor 910, wherein the processor 910 may call and run a computer program from a memory to implement the methods in the implementations of the present application.

Optionally, as shown in FIG. 9, the chip 900 may further include a memory 920, wherein the processor 910 may call and run a computer program from the memory 920 to implement the methods in the implementations of the present application.

In the above, the memory 920 may be a separate device independent of the processor 910 or may be integrated in the processor 910.

Optionally, the chip 900 may further include an input interface 930, wherein the processor 910 may control the input interface 930 to communicate with other devices or chips. Specifically, the processor 710 may acquire information or data sent by other devices or chips.

Optionally, the chip 900 may further include an output interface 940, wherein the processor 910 may control the output interface 940 to communicate with other devices or chips. Specifically, the processor 710 may output information or data to other devices or chips.

Optionally, the chip may be applied in a network device of an implementation of the present application, and the chip may implement the corresponding processes implemented by the network device in various methods of the implementations of the present application, which will not be repeated here for brevity.

Optionally, the chip may be applied in a mobile terminal/terminal device of an implementation of the present application, and the chip may implement the corresponding processes implemented by the mobile terminal/terminal device in the various methods of the implementations of the present application, which will not be repeated here for brevity.

It should be understood that the chip mentioned in the implementation of the present application may be referred to as a system-level chip, a system chip, a chip system or a system-on-chip, etc.

Figure 10:
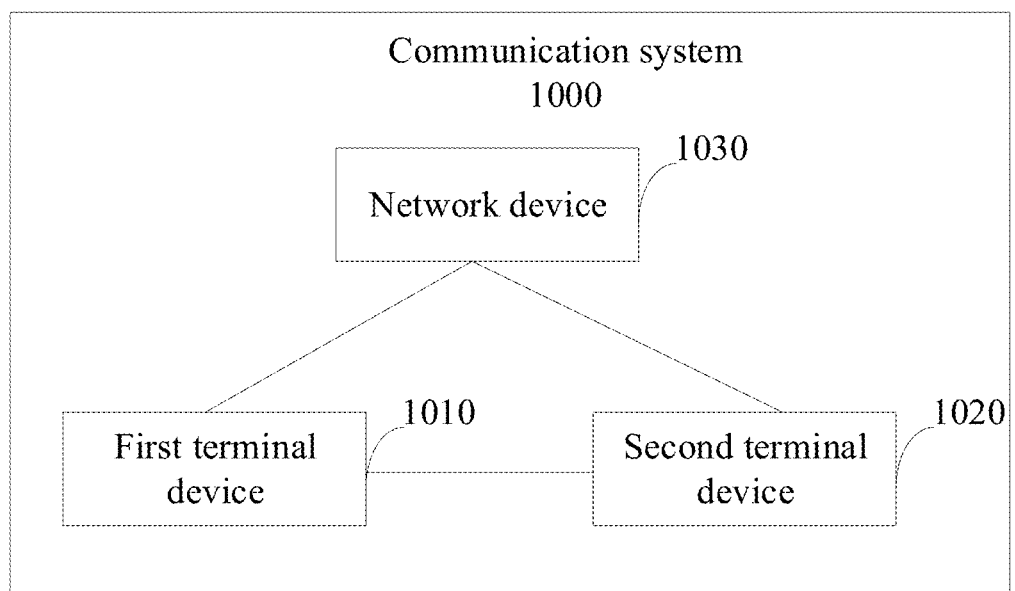
FIG. 10 is a schematic diagram of a communication system according to an implementation of the present application.

FIG. 10 is a schematic block diagram of a communication system 1000 provided by an implementation of the present application. As shown in FIG. 10, the communication system 1000 may include a first terminal device 1010, a second terminal device 1020 and a network device 1030.

In the above, the first terminal device 1010 may be configured to implement the corresponding functions implemented by the first terminal device in the above-mentioned method, and the second terminal device 1020 may be configured to implement the corresponding functions implemented by the first terminal device in the above-mentioned method, and the network device 1030 may be configured to implement the corresponding functions implemented by the network device in the above-mentioned method, which will not be repeated here for brevity.

It should be understood that, the processor in an implementation of the present application may be an integrated circuit chip having a signal processing capability. In an implementation process, the steps of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, steps and logical block diagrams disclosed in this implementation of this application. The general purpose processor may be a microprocessor, or the processor may be any conventional processor or the like. The steps of the method disclosed with reference to this implementation of this application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in this implementation of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

It should be understood that, the foregoing memory is an example for illustration and should not be construed as limiting. For example, optionally, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present application are intended to include, but are not limited to, these and any other suitable types of memories.

An implementation of the present application further provides a computer readable storage medium configured to store a computer program.

Optionally, the computer readable storage medium may be applied in a network device of an implementation of the present application, and the computer program causes the computer to perform the corresponding processes implemented by the network device in various methods of the implementations of the present application, which will not be repeated here for brevity.

Optionally, the computer readable storage medium may be applied in a mobile terminal/terminal device of an implementation of the present application, and the computer program causes the computer to perform the corresponding processes implemented by the mobile terminal/terminal device in various methods of the implementations of the present application, which will not be repeated here for brevity.

An implementation of the present application also provides a computer program product including computer program instructions.

Optionally, the computer program product may be applied in a network device of an implementation of the present application, and the computer program instructions cause the computer to perform the corresponding processes implemented by the network device in various methods of the implementation of the present application, which will not be repeated here for brevity.

Optionally, the computer program product may be applied in a mobile terminal/terminal device of an implementation of the present application, and the computer program instructions cause the computer to perform the corresponding processes implemented by the mobile terminal/terminal device in various methods according to the implementations of the present application, which will not be repeated here for brevity.

An implementation of the present application also provides a computer program.

Optionally, the computer program may be applied in a network device of an implementation of the present application. When the computer program is run on a computer, the computer is caused to perform the corresponding processes implemented by the network device in various methods of the implementations of the present application, which will not be repeated here for brevity.

Optionally, the computer program may be applied in a mobile terminal/terminal device of an implementation of the present application. When the computer program is run on a computer, the computer is caused to perform the corresponding processes implemented by the mobile terminal/terminal device in various methods of the implementations of the present application, which will not be repeated here for brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Those skilled in the art may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the method implementations and will not be described here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claimed is:

1. A communication method, comprising:
    receiving, by a first terminal device, a first message on a first sidelink transmission channel sent by a second terminal device, wherein the first sidelink transmission channel is used for transmitting the first message;
    sending, by the first terminal device, a second message on a second sidelink transmission channel to the second terminal device in response to the first message, wherein the second sidelink transmission channel is used for transmitting the second message, and the second message is a feedback message of the first message; and
    determining, by the first terminal device, a first transmission resource from a first transmission resource set according to a group identifier of a first terminal device group, wherein the group identifier is a device group identifier for identifying a group that the first terminal device group belongs to,
    wherein determining, by the first terminal device, the first transmission resource, comprises:
        acquiring, by the first terminal device, the first transmission resource set; and
        determining, by the first terminal device, the first transmission resource from the first transmission resource set,
    wherein determining, by the first terminal device, the first transmission resource from the first transmission resource set comprises:

determining, by the first terminal device, the first transmission resource from the first transmission resource set further according to at least one of the following: an identifier of the first terminal device, or second indication information sent to the first terminal device by the second terminal device, wherein receiving, by the first terminal device, the second indication information while receiving the first message.

2. The method of claim 1, wherein sending, by the first terminal device, the second message on the second sidelink transmission channel to the second terminal device, comprises:

sending, by the first terminal device, the second message on the second sidelink transmission channel to the second terminal device on the first transmission resource.

3. The method of claim 2, wherein determining, by the first terminal device, the first transmission resource, comprises:

determining, by the first terminal device, the first transmission resource according to at least one of the following: an identifier of the first terminal device, a group identifier of a group that the first terminal device belongs to, first indication information for indicating the first transmission resource sent by the second terminal device, or preconfigured information, wherein the first terminal device group is a terminal device group comprising the first terminal device and the second terminal device.

4. The method of claim 3, wherein the first indication information is carried in a physical sidelink control channel (PSCCH) or a physical sidelink shared channel (PSSCH).

5. The method of claim 1, wherein the second indication information comprises information of the group identifier of the first terminal device group.

6. The method of claim 1, wherein the group identifier of the first terminal device is a member identifier of the first terminal device in the first terminal device group, or the group identifier of the first terminal device is a cell radio network temporary identifier of the first terminal device.

7. The method of claim 1, wherein the first transmission resource set is preconfigured on the first terminal device based on a protocol.

8. The method of claim 1, wherein the resources in the first transmission resource set are located in a same time unit.

9. The method of claim 1, wherein the second indication information is carried in a physical sidelink control channel (PSCCH) or a physical sidelink shared channel (PSSCH).

10. The method of claim 1, wherein the second message comprises at least one piece of the following information: acknowledgement (ACK)/negative acknowledgement (NACK) information, channel quality indication information, channel state information, beam indication information, precoding matrix indication information, rank indicator or power information, wherein the second message is sent in response to the first message.

11. The method of claim 1, wherein the second sidelink transmission channel is used for transmitting a sequence which carries the second message.

12. The method of claim 1, wherein the first message is sent by unicast or groupcast.

13. A terminal device, wherein the terminal device is a first terminal device, the first terminal device comprising a processor configured to:

receive a first message on a first sidelink transmission channel sent by a second terminal device, wherein the first sidelink transmission channel is used for transmitting the first message;

send a second message on a second sidelink transmission channel to the second terminal device in response to the first message, wherein the second sidelink transmission channel is used for transmitting the second message, and the second message is a feedback message of the first message;

determine a first transmission resource from a first transmission resource set according to a group identifier of a first terminal device group, wherein the group identifier is a device group identifier for identifying a group that the first terminal device group belongs to, wherein determining the first transmission resource, comprises:

acquiring the first transmission resource set; and determining the first transmission resource from the first transmission resource set, wherein determining the first transmission resource from the first transmission resource set comprises:

determining the first transmission resource from the first transmission resource set further according to at least one of the following: an identifier of the first terminal device, or second indication information sent to the first terminal device by the second terminal device, wherein receiving the second indication information while receiving the first message.

14. The terminal device of claim 13, wherein the processor is further configured to send the second message to the second terminal device on the first transmission resource.

15. The terminal device of claim 14, wherein the processor is further configured to determine the first transmission resource according to at least one of the following:

an identifier of the first terminal device, first indication information for indicating the first transmission resource sent by the second terminal device, or preconfigured information, wherein the first terminal device group is a terminal device group comprising the first terminal device and the second terminal device.

16. The terminal device of claim 15, wherein the first indication information is carried in a physical sidelink control channel (PSCCH) or a physical sidelink shared channel (PSSCH).

17. The method of claim 14, wherein the first terminal device is further configured to receive second indication information while receiving the first message, wherein the second indication information is sent to the first terminal device by the second terminal device, and wherein the second indication information is for determining the first transmission resource.

18. The terminal device of claim 13, wherein the identifier of the first terminal device is a member identifier of the first terminal device in the first terminal device group, or the identifier of the first terminal device is a cell radio network temporary identifier of the first terminal device.

19. The terminal device of claim 13, wherein the first transmission resource set is preconfigured on the first terminal device based on a protocol.

20. The terminal device of claim 13, wherein resources in the first transmission resource set are located in a same time unit.

21. The terminal device of claim 13, wherein the second indication information is carried in a physical sidelink control channel (PSCCH) or a physical sidelink shared channel (PSSCH).

22. The terminal device of claim 13, wherein the second message comprises at least one piece of the following information: acknowledgement (ACK)/negative acknowledgement (NACK) information, channel quality indication information, channel state information, beam indication information, precoding matrix indication information, rank indicator or power information.

23. The terminal device of claim 13, wherein the second sidelink transmission channel is used for transmitting a sequence which carries the second message.

24. The terminal device of claim 13, wherein the first message is transmitted by unicast or groupcast.

* * * * *